United States Patent
Wang et al.

(10) Patent No.: US 9,973,716 B2
(45) Date of Patent: May 15, 2018

(54) RESET NOISE REDUCTION FOR PIXEL READOUT WITH PSEUDO CORRELATED DOUBLE SAMPLING

(71) Applicant: SAMSUNG ELECTRONICS CO., LTD., Suwon-si (KR)

(72) Inventors: Yibing M. Wang, Temple City, CA (US); Hongyu Wang, San Gabriel, CA (US); Tae-Chan Kim, Yongin (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 14/242,919

(22) Filed: Apr. 2, 2014

(65) Prior Publication Data
US 2015/0036035 A1  Feb. 5, 2015

Related U.S. Application Data

(60) Provisional application No. 61/861,586, filed on Aug. 2, 2013.

(51) Int. Cl.
  *H04N 5/357* (2011.01)
  *H04N 5/363* (2011.01)
(52) U.S. Cl.
  CPC .......... *H04N 5/3575* (2013.01); *H04N 5/363* (2013.01)
(58) Field of Classification Search
  CPC ....... H04N 5/3575; H04N 5/363; H04N 5/357
  USPC ........................................ 348/308
  See application file for complete search history.

(56) References Cited

U.S. PATENT DOCUMENTS

| | | | |
|---|---|---|---|
| 6,008,486 A | * | 12/1999 | Stam .................. H04N 5/23258 250/208.1 |
| 6,965,707 B1 | | 11/2005 | Kozlowski |
| 7,268,814 B1 | | 9/2007 | Pain et al. |
| 7,446,806 B2 | | 11/2008 | Carlson et al. |
| 7,825,971 B2 | | 11/2010 | Hynecek |
| 7,929,035 B2 | | 4/2011 | Atlas et al. |
| 8,115,841 B2 | | 2/2012 | Solhusvik |
| 8,169,517 B2 | | 5/2012 | Poonnen et al. |
| 8,179,464 B2 | | 5/2012 | Schemmann et al. |
| 8,330,092 B2 | | 12/2012 | Martin et al. |
| 8,358,360 B2 | | 1/2013 | Koseki |
| 2008/0252742 A1 | * | 10/2008 | Oike .................... H04N 5/3741 348/222.1 |

(Continued)

*Primary Examiner* — Twyler Haskins
*Assistant Examiner* — Akshay Trehan
(74) *Attorney, Agent, or Firm* — Sughrue Mion, PLLC

(57) ABSTRACT

Provided are an imaging device implementing pseudo correlated double sampling (CDS), and an imaging method and a control method of the image device. The imaging device includes: a pixel array comprising a pixel configured to generate a current in response to incident light; a readout circuit configured to read out a plurality of output signals of the pixel, the plurality of output signals corresponding to a plurality of consecutive integration periods of the pixel within an aggregating period; and an aggregator configured to aggregate the plurality of output signals read out by the readout circuit to obtain a final aggregated output corresponding to illuminance for the aggregating period, wherein the readout circuit is configured to read out the plurality of output signals by, for each output signal, sampling a signal voltage of the pixel and sampling a subsequent reset voltage of the pixel and obtaining a difference therebetween.

20 Claims, 5 Drawing Sheets

(56) References Cited

U.S. PATENT DOCUMENTS

| | | |
|---|---|---|
| 2011/0035427 A1 | 2/2011 | Joseph et al. |
| 2011/0080500 A1* | 4/2011 | Wang ................ G06K 7/10722 348/231.3 |
| 2012/0001060 A1 | 1/2012 | He |
| 2012/0217376 A1 | 8/2012 | Ackland et al. |
| 2012/0286141 A1 | 11/2012 | Dierickx |
| 2012/0307121 A1 | 12/2012 | Lu et al. |
| 2013/0050553 A1 | 2/2013 | Bugnet et al. |
| 2013/0075593 A1 | 3/2013 | Williams, Jr. |

* cited by examiner

RESET NOISE REDUCTION FOR PIXEL READOUT WITH PSEUDO CORRELATED DOUBLE SAMPLING

CROSS-REFERENCE TO RELATED APPLICATION

This application claims the benefit of U.S. Provisional Application No. 61/861,586, filed on Aug. 2, 2013 in the U.S. Patent and Trademark Office, the disclosure of which is incorporated herein by reference in its entirety.

BACKGROUND

1. Field

Apparatuses and methods consistent with exemplary embodiments relate to canceling noise in an image sensor, and more particularly to canceling noise by aggregating pseudo correlated double sampling (CDS) output signals with full integration.

2. Description of the Related Art

A related art complementary metal-oxide-semiconductor (CMOS) imaging sensor typically includes an array of image sensing pixels. FIG. 1 illustrates a circuit diagram of a related art image sensing pixel 100, which is referred to as a 4T pixel because the pixel 100 includes four transistors. As shown in FIG. 1, the 4T pixel 100 also includes a photodetector PD, which generates a current in response to detecting incident light. The generated current is accumulated (or integrated) to generate a voltage, which is read out of the 4T pixel 100 as an output signal. To reset the pixel, a reset transistor RST is turned on. Furthermore, to start a new integration period, the reset transistor RST is turned off, thereby allowing the generated current to integrate. The integration period of a pixel corresponds to a period between resets of the pixel.

A major source of noise in the image sensing pixels is the reset transistor RST, which can exhibit reset noise such as flicker noise, thermal noise (i.e., kTC noise), and other types of noise. One related art technique to reduce reset noise in the 4T pixel is correlated double sampling (CDS). Generally, CDS is a method to measure an electrical value that allows removal of an undesired offset based on two output measurements, i.e., an output measurement in a known condition and an output measurement in an unknown condition. When used in a CMOS imaging sensor, CDS is a noise-reduction technique based on a difference between a reference voltage (i.e., reset voltage after the pixel is reset) and a signal voltage (i.e., the pixel's voltage at the end of integration) at the end of each integration period.

FIG. 2 illustrates an example timing diagram of the related art on-chip CDS. As an example, for on-chip CDS, the related art 4T pixel 100 has a general operation order including sample reset voltage, charge transfer, and sample signal voltage for each integration period. The sample reset and the signal sample have a correlated kTC component, while flicker noise may generally be high at low frequency only.

In detail, as shown in FIG. 2, the reset voltage Vrst corresponds to $Vrst=Vr+Nktc+Nf(r)$, where Vr is the ideal reset voltage, Nktc is the correlated thermal noise component, and Nf(r) is the flicker noise component at the reset. Furthermore, the signal voltage Vsig corresponds to $Vsig=Vr+Nktc+Nf(s)-Vlight$, where Nf(s) is the flicker noise component at the signal sample and Vlight is the illuminance voltage, i.e., integrated voltage value corresponding to illuminance.

The correlated thermal noise component Nktc is canceled out by the difference between the signal voltage and the reset voltage: $Vrst-Vsig=Vlight+Nf(r)-Nf(s)$. Moreover, when the time difference between the sample reset and the signal sample is short such that $Nf(r)=Nf(s)$, the flicker noise components Nf(r) and Nf(s) can also be canceled by the difference between the signal voltage and the reset voltage, such that only the illuminance voltage Vlight is left.

For CMOS imaging sensors including low transistor count pixels, such as sensors with 3T or 5T pixels, or binary sensors with 1T or 2T pixels, the on-chip CDS is not applicable. FIG. 3 illustrates a circuit diagram of a related art 3T pixel 300. In this case, a related art pseudo-CDS technique or a related art off-chip CDS technique can be used. FIG. 4 illustrates an example timing diagram of the related art pseudo-CDS and the related art off-chip CDS.

In the related art pseudo-CDS, the signal voltage is sampled and then the subsequent reset voltage for the next integration period is sampled and a difference therebetween is read out. However, this approach will not cancel or reduce the kTC noise. In detail, as shown in FIG. 4, the reset voltage Vrst(1) at pseudo-CDS readout interval (1) corresponds to $Vrst(1)=Vr+Nktc(1)+Nf(r1)$, where Vr is the ideal reset voltage, Nktc(1) is the thermal noise component at the reset of a second integration period (1), and Nf(r1) is the flicker noise component at the reset in the readout interval (1). Furthermore, the signal voltage Vsig(1) at the particular readout interval (1) corresponds to $Vsig(1)=Vr+Nktc(0)+Nf(s1)-Vlight$, where Nktc(0) is the thermal noise component at the signal of a first integration period (0) preceding the abovementioned second integration period, Nf(s1) is the flicker noise component at the signal in the readout interval (1), and Vlight is the illuminance voltage.

Thus, using pseudo-CDS, the difference between the signal voltage and the reset voltage can cancel the flicker noise Nf, since $Nf(1)=Nf(r1)=Nf(s1)$, but cannot cancel the thermal noise component since Nktc(0) and Nktc(1) of the different integration periods are not correlated: $Vrst(1)-Vsig(1)=Vlight+Nktc(1)-Nktc(0)$.

Meanwhile, the related art off-chip CDS involves saving a reset frame then a signal frame and subtracting the signal frame from the reset frame: $Vrst(0)-Vsig(1)=Vlight+Nf(0)-Nf(1)$. In this approach, although the kTC noise can be canceled since the reset and signal are correlated, the flicker noise cannot be canceled because its level changes without correlation after integration. In addition, the off-chip CDS utilizes additional components (e.g., memory).

SUMMARY

Aspects of one or more exemplary embodiments relate to methods and apparatuses for canceling reset noise in CMOS imaging sensors. Furthermore, aspects of one or more exemplary embodiments relate to methods and apparatuses for canceling reset noise in CMOS imaging sensors utilizing pseudo-CDS for pixel readouts.

According to an aspect of an exemplary embodiment, there is provided an imaging device implementing pseudo-CDS for pixel readouts, the imaging device including: a pixel array comprising a pixel configured to generate a current in response to incident light; a readout circuit configured to read out a plurality of output signals of the pixel, the plurality of output signals corresponding to a plurality of consecutive integration periods of the pixel within an aggregating period; and an aggregator configured to aggregate the plurality of output signals read out by the readout circuit to obtain a final aggregated output corresponding to illuminance for the aggregating period, wherein the readout circuit is configured to read out the plurality of output signals by, for each output signal, sampling a signal voltage of the pixel and sampling a reset voltage, subsequent to the signal voltage, of the pixel and obtaining a difference between the sampled signal voltage and the sampled reset voltage.

The pixel may be a 1T pixel, a 2T pixel, a 3T pixel, or a 5T pixel.

A signal-to-noise ratio for the final aggregated output may correspond to:

$$SNR_{k\_full} = k \cdot Vlight / \sqrt{2\sigma_{kTC}^2 + k\sigma_{rd}^2},$$

where k corresponds to a number of the plurality of consecutive integration periods, Vlight corresponds to illuminance voltages for the plurality of consecutive integration periods, σkTC corresponds to standard deviation of kTC noise, and σrd corresponds to standard deviation of read noise.

Thermal noise components corresponding to consecutive output signals may be correlated in the final aggregated output.

The final aggregated output Vfinal may correspond to: Vfinal=k*Vlight+Nktc(k)−Nktc(0)+Nrd(1)+ Nrd(2)+ . . . +Nrd(k), where k corresponds to a number of the plurality of consecutive integration periods within the aggregating period, k*Vlight corresponds to a sum of illuminance voltages for the plurality of consecutive integration periods, Nktc(k) corresponds to a thermal noise component of a last output signal of the plurality of output signals, Nktc(0) corresponds to a thermal noise component of a first output signal of the plurality of output signals, and Nrd( ) corresponds to a readout noise.

The plurality of consecutive integration periods may vary in length.

The plurality of consecutive integration periods may be of equal length.

The aggregating period may correspond to an image frame.

The aggregating period may be less than a period of the image frame.

The aggregating period may correspond to a plurality of consecutive image frames.

The pixel array may be a complementary metal-oxide-semiconductor (CMOS) image sensor pixel array.

According to an aspect of another exemplary embodiment, there is provided an image sensing method of an imaging device implementing pseudo-CDS for pixel readouts, the method including: reading out a plurality of output signals of a pixel of the imaging device, the plurality of output signals corresponding to a plurality of consecutive integration periods of the pixel within an aggregating period; and aggregating the plurality of output signals read out by the readout circuit to obtain a final aggregated output corresponding to illuminance for the aggregating period, wherein the reading out includes, for each output signal, sampling a signal voltage of the pixel and sampling a reset voltage, subsequent to the signal voltage, of the pixel and obtaining a difference between the sampled signal voltage and the sampled reset voltage.

The pixel may be a 1T pixel, a 2T pixel, a 3T pixel, or a 5T pixel.

A signal-to-noise ratio for the final aggregated output may correspond to:

$$SNR_{k\_full} = k \cdot Vlight / \sqrt{2\sigma_{kTC}^2 + k\sigma_{rd}^2},$$

where k corresponds to a number of the plurality of consecutive integration periods, Vlight corresponds to illuminance voltages for the plurality of consecutive integration periods, σkTC corresponds to standard deviation of kTC noise, and σrd corresponds to standard deviation of read noise.

Thermal noise components corresponding to consecutive output signals may be correlated in the final aggregated output.

The final aggregated output Vfinal may correspond to: Vfinal=k*Vlight+Nktc(k)−Nktc(0)+Nrd(1)+ Nrd(2)+ . . . +Nrd(k), where k corresponds to a number of the plurality of consecutive integration periods within the aggregating period, k*Vlight corresponds to a sum of illuminance voltages for the plurality of consecutive integration periods, Nktc(k) corresponds to a thermal noise component of a last output signal of the plurality of output signals, Nktc(0) corresponds to a thermal noise component of a first output signal of the plurality of output signals, and Nrd( ) corresponds to a readout noise.

According to an aspect of another exemplary embodiment, there is provided a control method of an imaging device implementing pseudo-CDS for pixel readouts, the method including: controlling a readout circuit of the imaging device to read out a plurality of output signals of a pixel of the imaging device, the plurality of output signals corresponding to a plurality of consecutive integration periods of the pixel within an aggregating period; and obtaining a final aggregated output in which thermal noise components corresponding to consecutive output signals, of the plurality of output signals, are correlated and thereby reduced, the final aggregated output corresponding to illuminance for the aggregating period of the pixel.

A signal-to-noise ratio for the final aggregated output may correspond to:

$$SNR_{k\_full} = k \cdot Vlight / \sqrt{2\sigma_{kTC}^2 + k\sigma_{rd}^2},$$

where k corresponds to a number of the plurality of consecutive integration periods, Vlight corresponds to illuminance voltages for the plurality of consecutive integration periods, σkTC corresponds to standard deviation of kTC noise, and σrd corresponds to standard deviation of read noise.

The final aggregated output Vfinal may correspond to: Vfinal=k*Vlight+Nktc(k)−Nktc(0)+Nrd(1)+Nrd(2)+ . . . +Nrd(k), where k corresponds to a number of the plurality of consecutive integration periods within the aggregating period, k*Vlight corresponds to a sum of illuminance voltages for the plurality of consecutive integration periods, Nktc(k) corresponds to a thermal noise component of a last output signal of the plurality of output signals, Nktc(0) corresponds to a thermal noise component of a first output signal of the plurality of output signals, and Nrd( ) corresponds to a readout noise.

According to an aspect of another exemplary embodiment, there is provided a computer-readable recording medium having recorded thereon a program executable by a computer for performing the control method.

BRIEF DESCRIPTION OF THE DRAWINGS

The above and/or other aspects will be more apparent by describing exemplary embodiments with reference to the accompanying drawings, in which.

DETAILED DESCRIPTION OF EXEMPLARY EMBODIMENTS

Figure 1:
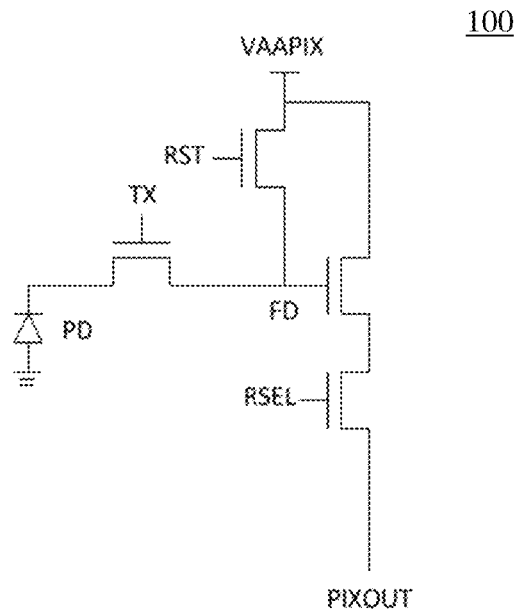
FIG. 1 is a circuit diagram of a related art image sensing 4T pixel.
Figure 2:
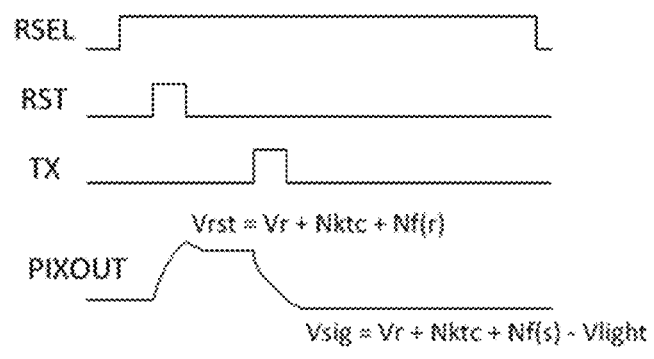
FIG. 2 is an example timing diagram of a related art on-chip CDS.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

According to aspects of one of more exemplary embodiments, pseudo-CDS outputs corresponding to a plurality of consecutive integration periods are aggregated to reduce thermal (kTC) noise and flicker noise in CMOS imaging sensors. Furthermore, according to aspects of one or more exemplary embodiments, full integration (i.e., aggregating pseudo-CDS outputs for all of a set of consecutive integration periods) is used resulting in correlated thermal noise terms.

Figure 5:
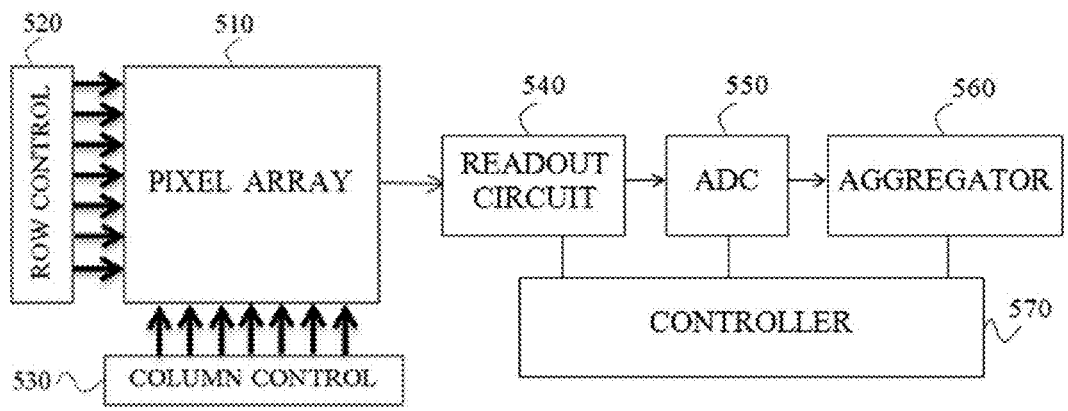
FIG. 5 is a block diagram of an imaging device 500 according to an exemplary embodiment.

FIG. 5 is a block diagram of an imaging device 500 according to an exemplary embodiment. By way of example, the imaging device 500 may be a CMOS imaging sensor, and may be included in any device including an image capturing device such as a camera, a mobile phone, a tablet, a personal computer, etc. Referring to FIG. 5, the imaging device 500 includes a pixel array 510, a row control 520, a column control 530, a readout circuit 540, one or more analog-to-digital converters (ADC) 550, an aggregator 560, and a controller 570. The imaging device 500 may include additional components in one or more other exemplary embodiments, such as one or more amplifiers, memory, control logic, a reference voltage and current generator, a phase lock loop, an image and signal processing unit, a parallel and/or serial interface, etc.

Figure 3:
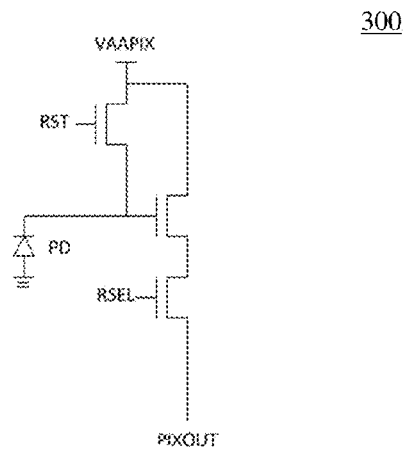
FIG. 3 is a circuit diagram of a related art image sensing 3T pixel.
Figure 4:
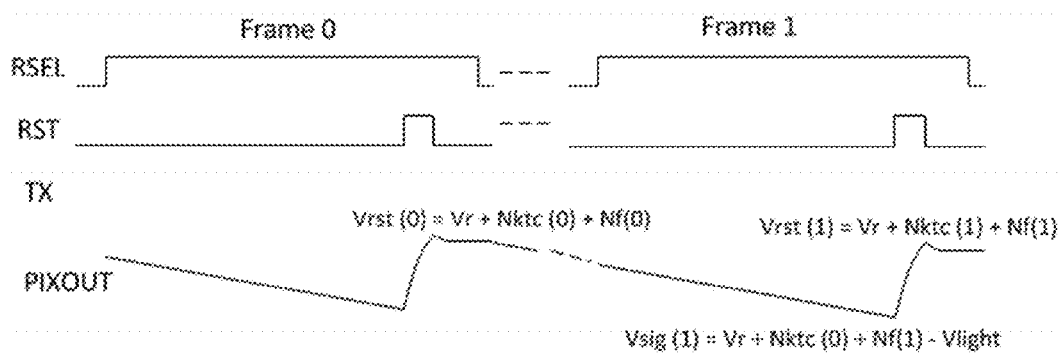
FIG. 4 is an example timing diagram of a related art pseudo-CDS and a related art off-chip CDS.

The pixel array 510 includes rows and columns of image sensing pixels that are configured to generate a current in response to detecting incident light. The generated current is accumulated (or integrated) to generate a voltage as an output signal. In the present exemplary embodiment, the image sensing pixels may be 3T pixels (such as shown in FIG. 3), although it is understood that one or more exemplary embodiments are not limited thereto. For example, according to one or more other exemplary embodiments, the image sensing pixels may be 1T pixels, 2T pixels, 5T pixels, etc. Furthermore, it is understood that aspects of exemplary embodiments are applicable to any imaging sensing pixel for which pseudo-CDS is utilized for pixel readouts. As described above, the image sensing pixels may exhibit reset noise, such as flicker noise and kTC noise.

The row control 520 is configured to control which row of the pixel array 510 will be read out at a certain readout interval, and the column control 530 is configured to control which column of the pixel array 510 will be read out at a certain readout interval.

The readout circuit 540 is configured to read out, implementing pseudo-CDS, an output signal in each of the pixels according to controls of the row control 520 and the column control 530. For example, the readout circuit 520 may be a column readout circuit. In detail, for a particular readout interval, the readout circuit 540 is configured to sample a signal voltage of the pixel and to sample a subsequent reset voltage of the pixel and output a difference therebetween.

The one or more ADCs 550 are configured to digitize the pseudo-CDS output of each pixel from the readout circuit 540.

The aggregator 560 is configured to aggregate (i.e., sum) the digitized output signals from the readout circuit 540 for a plurality of consecutive integration periods for each pixel of the pixel array 510, in order to output a final aggregated output (e.g., final aggregated voltage) corresponding to illuminance for the pixel. In one or more exemplary embodiments, the aggregator 560 may include a memory or communicate with a memory that stores a partial sum of the digitized output signals within an aggregating period. That is, for each integration period within an aggregating period, the aggregator 560 is configured to read out the partial sum from the memory, add the new readout value for the integration period, and write the new partial sum back to memory.

By reading out and aggregating output signals for all integration periods within a particular aggregating period, thermal noise components of consecutive readout intervals are correlated, thereby reducing the thermal noise in the final aggregated voltage (as described in detail below). In contrast, a related art method that does not read out output signals corresponding to every shutter reset, i.e., for every integration period, results in thermal noise components that are not correlated for consecutive read out output signals. The aggregator 560 may be implemented as hardware, as software, or as a combination of hardware and software, and may be implemented either on-chip or off-chip.

The controller 570 is configured to control the readout circuit 540 to read out an output signal of a pixel for every integration period (i.e., corresponding to every shutter reset) within an aggregating period. That is, the controller 570 is configured to control the readout circuit 540 such that any time that the pixel is reset, the readout circuit 540 samples a signal voltage of the pixel and a subsequent reset voltage of the pixel and outputs a difference therebetween. The aggregating period may correspond to a predetermined time interval or to a predetermined number of image frames (e.g., each aggregating period may correspond to one image frame). Furthermore, in one or more exemplary embodiments, the controller 570 may be configured to control the aggregator 560 to aggregate output signals from the readout circuit 540 for a plurality of consecutive integration periods for each pixel of the pixel array 510, in order to output the final aggregated voltage.

Figure 6:
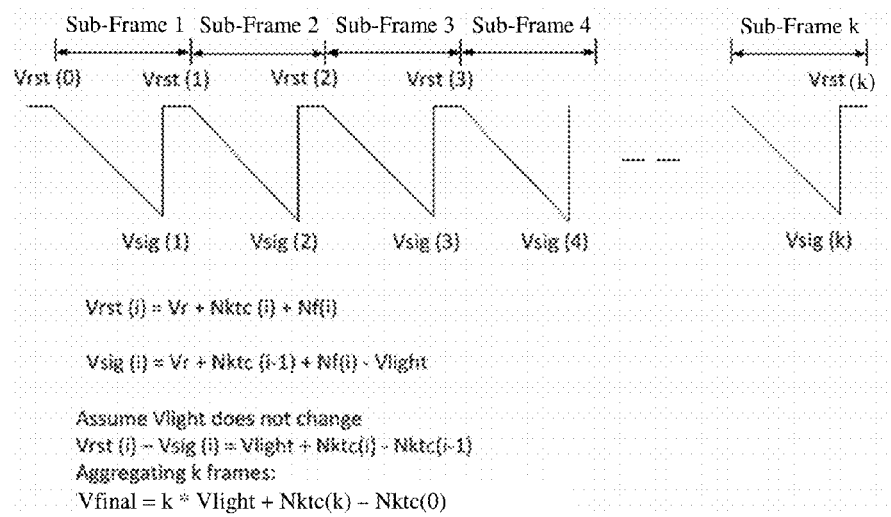
FIG. 6 is an example timing diagram of a pseudo-CDS implemented according to an exemplary embodiment.

FIG. 6 illustrates an example timing diagram of a pseudo-CDS implemented according to an exemplary embodiment, in which output signals for k consecutive readout intervals of an aggregating period are aggregated (where k is a positive integer greater than 1). In the present exemplary embodiment, the readout intervals correspond to all of consecutive shutter resets within an aggregating period.

Moreover, in the present exemplary embodiment, each integration period corresponds to a sub-frame, i.e., less than a length of an image frame period due to shutter resets within the image frame period. However, it is understood that one or more exemplary embodiments are not limited thereto. For example, according to another exemplary embodiment, the integration period may be equal to the image frame period, wherein the image signal processor 500 aggregates output signals for a plurality of consecutive image frames.

Furthermore, while in the present exemplary embodiment each integration period is of equal length (e.g., in a case where shutter resets are controlled at predetermined intervals), it is understood that one or more other exemplary embodiments are not limited thereto. For example, according to another exemplary embodiment, each integration period may vary in length (e.g., in a case where shutter resets are controlled in response to a predetermined condition), as will be exemplarily described below with reference to FIG. 7. Moreover, it is understood that the integration periods from one pixel to the next may or may not differ in length according to various exemplary embodiments.

In related art CMOS imaging sensors implementing pseudo-CDS, the signal is read then reset, but thermal noise components are not canceled or reduced since the thermal noise components are not correlated. However, an imaging sensor implementing pseudo-CDS according to the present exemplary embodiment is able to reduce the thermal noise components by reading out and aggregating output signals corresponding to a plurality of consecutive integration periods in an aggregating period (i.e., full integration).

In detail, with reference to FIG. 6, the reset voltage Vrst(i) at a particular readout interval (i) corresponds to Vrst(i)=Vr+Nktc(i)+Nf(ri), where Vr is the ideal reset voltage, Nktc(i) is the thermal noise component at the reset of a second integration period (i), and Nf(ri) is the flicker noise component at the reset in the readout interval (i). In the present exemplary embodiment, readout noise may be ignored, e.g., when the readout noise is much smaller than the thermal noise component. Furthermore, the signal voltage Vsig(i) at the particular readout interval (i) corresponds to Vsig(i)=Vr+Nktc(i−1)+Nf(si)−Vlight, where Nktc(i−1) is the thermal noise component of a first integration period (i−1) directly preceding the abovementioned second integration period (1), Nf(si) is the flicker noise component at the signal in the readout interval (i), and Vlight corresponds to the illuminance voltage.

Thus, a difference between the signal voltage and the reset voltage for a particular readout interval (i) does not cancel the thermal noise components since Nktc(i−1) and Nktc(i) are not correlated: Vrst(i)−Vsig(i)=Vlight+Nktc(i)−Nktc(i−1).

However, by aggregating pseudo-CDS output signals (Vrst(i)−Vsig(i)) for k consecutive readout intervals, corresponding to consecutive integration periods (i.e., full integration) according to the present exemplary embodiment, thermal noise components are correlated across readout intervals and therefore reduced. For example, pseudo-CDS outputs from two consecutive readout intervals, (i) and (i+1), correspond to:

$$Vrst(i)-Vsig(i)=Vlight(i)+Nktc(i)-Nktc(i-1);$$

and $$Vrst(i+1)-Vsig(i+1)=Vlight(i+1)+Nktc(i+1)-Nktc(i).$$

Thus, aggregating these outputs results in correlating the thermal noise component Nktc(1) across these consecutive readout intervals:

$$(Vrst(i)-Vsig(i))+(Vrst(i+1)-Vsig(i+1))=(Vlight(i)+Nktc(i)-Nktc(i-1))+(Vlight(i+1)+Nktc(i+1)-Nktc(i))=Vlight(i)+Vlight(i+1)+Nktc(i+1)-Nktc(i-1)$$

Accordingly, because thermal noise components are correlated across readout intervals, a final aggregated voltage Vfinal corresponds to: Vfinal=k*Vlight+Nktc(k)−Nktc(0). In this regard, only the first and the last thermal noise components Nktc(0) and Nktc(k) remain.

While in the above example the illuminance voltage Vlight is equal for each readout interval (which, for example, may be the case when the integration periods are of equal length), it is understood that one or more other exemplary embodiments are not limited thereto. For example, where the illuminance voltage is not the same for each readout interval (which, for example, may be the case when the integration periods are of different lengths), the final aggregated voltage Vfinal would correspond to: Vfinal=Vlight(1)+Vlight(2)+ . . . Vlight(k)+Nktc(k)−Nktc(0).

Accordingly, with a single sub-frame readout, the signal-to-noise ratio (SNR) corresponds to:

$$SNR_1 = Vlight/\sqrt{2\sigma_{kTC}} = \sqrt{1/2} \cdot Vlight/\sigma_{kTC},$$

where Vlight corresponds to an illuminance voltage and σkTC corresponds to standard deviation of kTC noise.

By aggregating with full integration according to an exemplary embodiment, the SNR corresponds to:

$$SNR_k = k \cdot Vfull\ light/\sqrt{2k\sigma_{kTC}} = \sqrt{k^2/2} \cdot Vlight/\sigma_{kTC},$$

where k corresponds to a number of the plurality of consecutive integration periods, Vlight corresponds to illuminance voltages for the plurality of consecutive integration periods, and σkTC corresponds to standard deviation of kTC noise.

Figure 7:
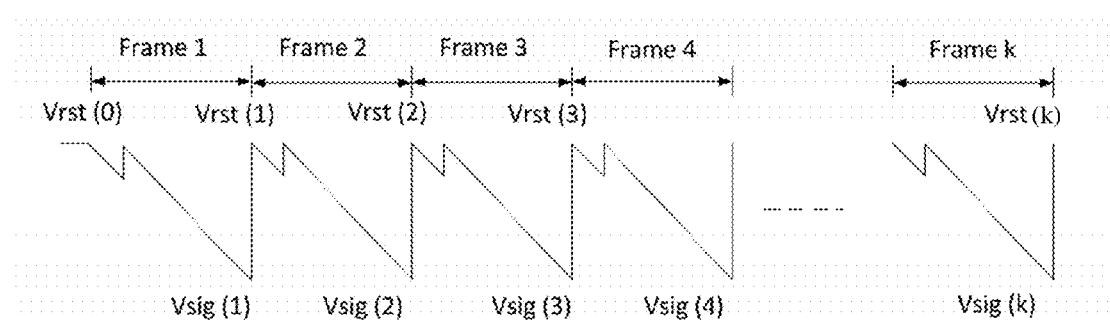
FIG. 7 is an example timing diagram of a related art aggregating without full integration.

In contrast, in a related art aggregating which does not read out an output signal for each shutter reset or integration period (i.e., without full integration), as shown in FIG. 7, thermal noise components are not correlated since output signals are not read out corresponding to each shutter reset. As shown in FIG. 7, an extra shutter reset is included inside each frame, and correlation between thermal noise components is lost. In this case, the SNR is lower:

$$SNR_k = k \cdot Vlight/\sqrt{2k\sigma_{kTC}^2} = \sqrt{k/2} \cdot Vlight/\sigma_{kTC}.$$

Meanwhile, in one or more other exemplary embodiments, the additional readout noise Nrd(i) may be considered in the aggregating, e.g., when the readout noise cannot be ignored such as when the application requires or when the noise is of at least a predetermined amount. In this case, the difference between the signal voltage and the reset voltage for a particular readout interval (i) includes an additional noise component: Vrst(i)−Vsig(i)=Vlight+Nktc(i)−Nktc(i−1)+Nrd(i).

In this case, by aggregating output signals of k consecutive readout intervals corresponding to consecutive integration periods according to the present exemplary embodiment, the final aggregated voltage Vfinal corresponds to: Vfinal=k*Vlight+Nktc(k)−Nktc(0)+Nrd(1)+Nrd(2)+ . . . +Nrd(k).

Here, with a single sub-frame readout, the SNR corresponds to:

$$SNR_1 = Vlight/\sqrt{2\sigma_{kTC}^2 + k\sigma_{rd}^2},$$

where σrd corresponds to standard deviation of read noise.

By aggregating with full integration according to an exemplary embodiment, the SNR corresponds to:

$$SNR_{k\_full} = k \cdot Vlight/\sqrt{2\sigma_{kTC}^2 + k\sigma_{rd}^2},$$

In contrast, in a related art aggregating without full integration, as shown in FIG. 7, the SNR is lower:

$$SNR_k = k \cdot Vlight/\sqrt{2\sigma_{kTC}^2 + k\sigma_{rd}^2},$$

As described above, an imaging device 500 according to an exemplary embodiment is capable of reducing reset noise and, in particular, thermal noise by aggregating output signals corresponding to a plurality of consecutive integration periods.

Figure 8:
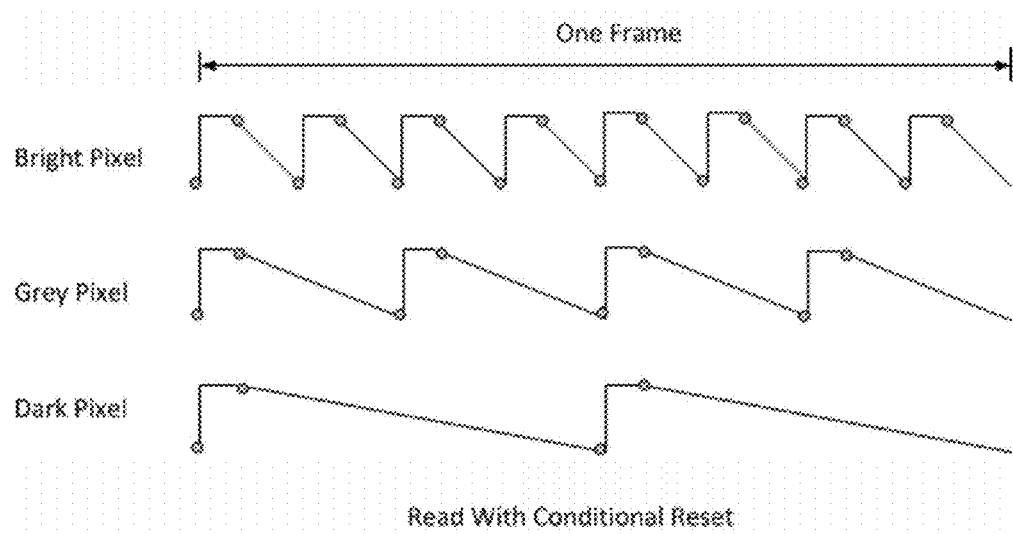
FIG. 8 illustrates exemplary timing diagrams in which integration periods vary in length based on conditional resets according to another exemplary embodiment.

FIG. 8 illustrates exemplary timing diagrams in which integration periods vary in length based on conditional resets, according to another exemplary embodiment. Referring to FIG. 8, it can be seen that bright pixels may be read out more frequently than grey pixels, which may also be read out more frequently than dark pixels. For example, in the present exemplary embodiment, the reset may be conditioned on the signal voltage reaching a predetermined level.

Figure 9:
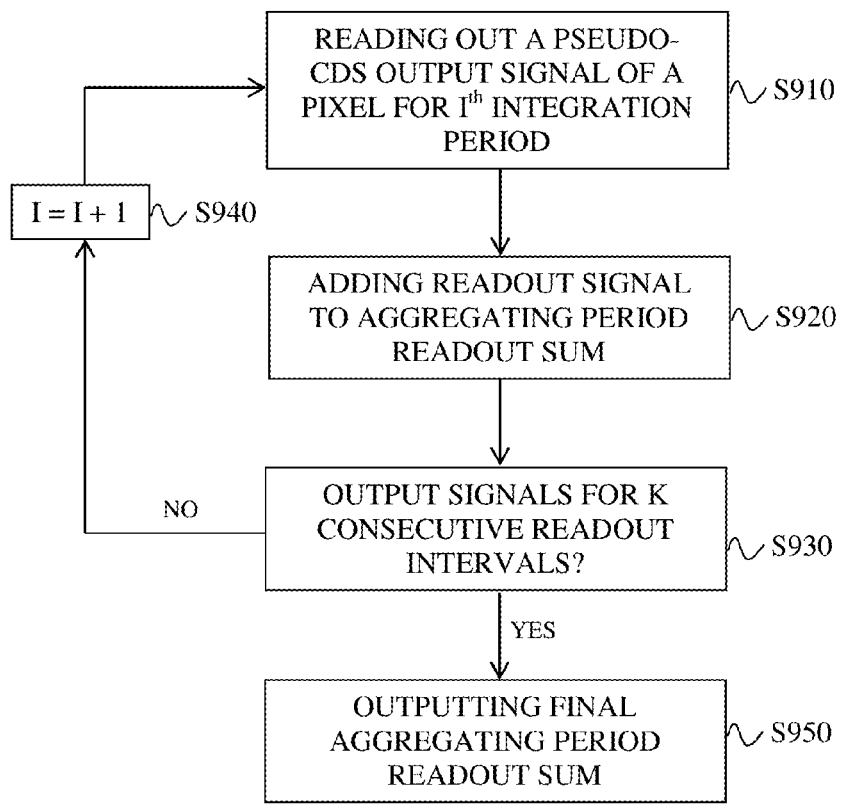
FIG. 9 is a flowchart of an image sensing method according to an exemplary embodiment.

FIG. 9 is a flowchart of an image sensing method according to an exemplary embodiment. For example, the image sensing method may be implemented by the imaging device 500 described above with reference to FIG. 5. Referring to FIG. 9, in operation S910, a readout circuit 540 reads out, implementing pseudo-CDS, an output signal of a pixel of a CMOS imaging sensor for a current integration period (i.e., corresponding to a shutter reset). Specifically, the readout circuit 540 samples a signal voltage and a subsequent reset voltage, and outputs a difference therebetween.

In operation S920, an aggregator 560 adds a digitized value of the readout output signal to an aggregating period readout sum, which corresponds to an ongoing sum of readout signals for a current aggregating period. In this case, if the current integration period is the first integration period in the current aggregating period, the digitized value is simply stored in a memory as the aggregating period readout sum.

In operation S930, it is determined whether output signals for k consecutive readout intervals (where k is a positive integer greater than 1 and corresponds to the number of integration periods in the current aggregating period) have been output by the readout circuit 540. If not, the readout circuit 540 reads out an output signal of the pixel for a next integration period in operations S940 and S910. That is, the method continuously aggregates output readout signals until the aggregating period ends.

If it is determined that output signals for k consecutive readout intervals have been output by the readout circuit 540 ("Yes" at operation S830), the aggregator 560 outputs the aggregating period readout sum stored in memory as a final aggregating period readout sum corresponding to illuminance in operation S950. According to an exemplary embodiment, because an output signal is read out for every integration period (i.e., corresponding to every shutter reset), thermal noise components across readout intervals are correlated when the output signals are aggregated, thereby reducing thermal noise. In a case where the illuminance voltage Vlight is the same for every readout interval, the final aggregated voltage Vfinal corresponds to: Vfinal=k*Vlight+Nktc(k)−Nktc(0).

Figure 10:
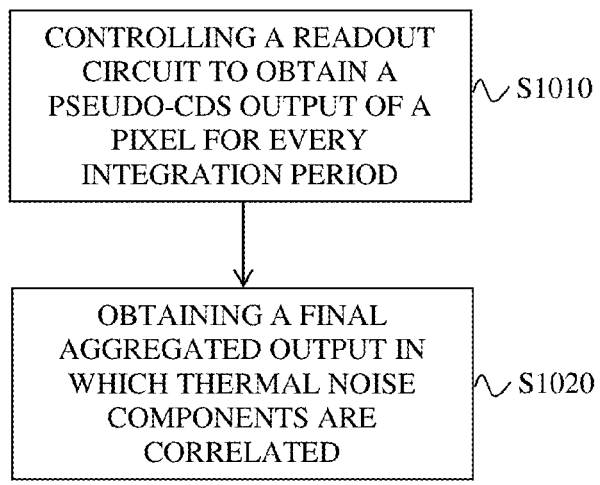
FIG. 10 is a flowchart of a control method for an imaging device according to an exemplary embodiment.

FIG. 10 is a flowchart of a control method for an imaging device according to an exemplary embodiment. For example, the control method of the present exemplary embodiment may be implemented by the controller 560 of the imaging device 500 described with reference to FIG. 5.

Referring to FIG. 10, in operation S1010, a readout circuit 540 is controlled so as to obtain a pseudo-CDS output signal of a pixel for every integration period within an aggregating period of the pixel. Then, in operation S1020, a final aggregated output (e.g., voltage) is obtained in which thermal noise components are correlated and thereby reduced. The final aggregated voltage may be obtained by controlling an aggregator 560 to aggregate the pseudo-CDS output signals, corresponding to consecutive integration periods, output by the readout circuit 540. While in the present exemplary embodiment each integration period may be of equal length (e.g., in a case where shutter resets are controlled at predetermined intervals), it is understood that one or more other exemplary embodiments are not limited thereto. For example, according to another exemplary embodiment, each integration period may vary in length (e.g., in a case where shutter resets are controlled in response to a predetermined condition). Moreover, it is understood that the integration periods from one pixel to the next may or may not differ in length according to various exemplary embodiments.

As described above, in a related art pseudo-CDS readout of pixels of a CMOS image sensor, thermal noise is not reduced since thermal noise components of a signal voltage and a reset voltage in a pseudo-CDS readout are not correlated. However, according to exemplary embodiments, pseudo-CDS outputs of a pixel in an imaging device are read out and aggregated with full integration, thereby resulting in correlated thermal noise components. Accordingly, thermal noise is reduced in a final aggregated output.

While not restricted thereto, an exemplary embodiment can be embodied as computer-readable code on a computer-readable recording medium. The computer-readable recording medium is any data storage device that can store data that can be thereafter read by a computer system, at least one processor, etc. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs.

Moreover, it is understood that in exemplary embodiments, one or more of the above-described components of the imaging device 500 can include circuitry, a processor, a microprocessor, etc., and may execute a computer program stored in a computer-readable medium.

The foregoing exemplary embodiments are merely exemplary and are not to be construed as limiting the present invention. The present teaching can be readily applied to other types of devices. Also, the description of exemplary embodiments is intended to be illustrative, and not to limit the scope of the claims, and many alternatives, modifications, and variations will be apparent to those skilled in the art.

What is claimed is:

1. An imaging device implementing pseudo correlated double sampling (CDS) for pixel readouts, the imaging device comprising:
   a pixel array comprising a pixel configured to generate a current in response to incident light;
   a readout circuit configured to read out a plurality of output signals of the pixel, the plurality of output signals corresponding to a plurality of consecutive integration periods of the pixel within an aggregating period; and
   an aggregator configured to aggregate the plurality of output signals read out by the readout circuit to obtain a final aggregated output corresponding to illuminance for the aggregating period,
   wherein the readout circuit is configured to read out the plurality of output signals by, for each output signal, sampling a signal voltage of the pixel and sampling a reset voltage, subsequent to the signal voltage, of the pixel and obtaining a difference between the sampled signal voltage and the sampled reset voltage, and
   wherein a thermal noise component of the final aggregated output includes only a thermal noise component of a first output signal of the plurality of output signals and a thermal noise component of a last output signal of the plurality of output signals.

2. The imaging device according to claim 1, wherein the pixel is a 1T pixel, a 2T pixel, a 3T pixel, a 5T pixel, or any pixel that uses a pseudo-CDS readout.

3. The imaging device according to claim 1, wherein a signal-to-noise ratio for the final aggregated output corresponds to:

$$SNR_{k\_full} = k \cdot Vlight / \sqrt{2\sigma_{kTC}^2 + k\sigma_{rd}^2},$$

where k corresponds to a number of the plurality of consecutive integration periods, Vlight corresponds to illuminance voltages for the plurality of consecutive integration periods, $\sigma kTC$ corresponds to standard deviation of kTC noise, and $\sigma rd$ corresponds to standard deviation of read noise.

4. The imaging device according to claim 1, wherein thermal noise components corresponding to consecutive output signals are correlated in the final aggregated output.

5. The imaging device according to claim 1, wherein the final aggregated output Vfinal corresponds to:

$$Vfinal = k \cdot Vlight + Nktc(k+1) - Nktc(0) + Nrd(1) + Nrd(2) + \ldots + Nrd(k),$$

where k corresponds to a number of the plurality of consecutive integration periods within the aggregating period, k*Vlight corresponds to a sum of illuminance voltages for the plurality of consecutive integration periods, Nktc(k+1) corresponds to the thermal noise component of the last output signal of the plurality of output signals, Nktc(0) corresponds to the thermal noise component of the first output signal of the plurality of output signals, and Nrd( ) corresponds to a readout noise.

6. The imaging device according to claim 1, wherein the plurality of consecutive integration periods vary in length.

7. The imaging device according to claim 1, wherein the plurality of consecutive integration periods are of equal length.

8. The imaging device according to claim 1, wherein the aggregating period corresponds to an image frame.

9. The imaging device according to claim 1, wherein the aggregating period is less than a period of an image frame.

10. The imaging device according to claim 1, wherein the aggregating period corresponds to a plurality of consecutive image frames.

11. The imaging device according to claim 1, wherein the pixel array is a complementary metal-oxide-semiconductor (CMOS) image sensor pixel array.

12. An image sensing method of an imaging device implementing pseudo-CDS for pixel readouts, the method comprising:
    reading out a plurality of output signals of a pixel of the imaging device, the plurality of output signals corresponding to a plurality of consecutive integration periods of the pixel within an aggregating period; and
    aggregating the plurality of output signals read out by the readout circuit to obtain a final aggregated output corresponding to illuminance for the aggregating period,
    wherein the reading out comprises, for each output signal, sampling a signal voltage of the pixel and sampling a reset voltage, subsequent to the signal voltage, of the pixel and obtaining a difference between the sampled signal voltage and the sampled reset voltage, and
    wherein a thermal noise component of the final aggregated output includes only a thermal noise component of a first output signal of the plurality of output signals and a thermal noise component of a last output signal of the plurality of output signals.

13. The method according to claim 12, wherein the aggregating comprises, for an integration period of the plurality of consecutive integration period, reading a stored aggregating period readout sum from a memory, adding a digitized value of an output signal for the integration period to the read aggregating period readout sum, and writing the aggregating period readout sum to which the digitized value is added to the memory.

14. The method according to claim 12, wherein a signal-to-noise ratio for the final aggregated output corresponds to:

$$SNR_{k\_full} = k \cdot Vlight / \sqrt{2\sigma_{kTC}^2 + k\sigma_{rd}^2},$$

where k corresponds to a number of the plurality of consecutive integration periods, Vlight corresponds to illuminance voltages for the plurality of consecutive integration periods, $\sigma kTC$ corresponds to standard deviation of kTC noise, and $\sigma rd$ corresponds to standard deviation of read noise.

15. The method according to claim 12, wherein thermal noise components corresponding to consecutive output signals are correlated in the final aggregated output.

16. The method according to claim 12, wherein the final aggregated output Vfinal corresponds to:

$$Vfinal = k \cdot Vlight + Nktc(k+1) - Nktc(0) + Nrd(1) + Nrd(2) + \ldots + Nrd(k),$$

where k corresponds to a number of the plurality of consecutive integration periods within the aggregating period, k*Vlight corresponds to a sum of illuminance voltages for the plurality of consecutive integration periods, Nktc(k+1) corresponds to the thermal noise component of the last output signal of the plurality of output signals, Nktc(0) corresponds to the thermal noise component of the first output signal of the plurality of output signals, and Nrd( ) corresponds to a readout noise.

17. A control method of an imaging device implementing pseudo-CDS for pixel readouts, the method comprising:
    controlling a readout circuit of the imaging device to read out a plurality of output signals of a pixel of the imaging device, the plurality of output signals corresponding to a plurality of consecutive integration periods of the pixel within an aggregating period; and obtaining a final aggregated output in which thermal noise components corresponding to consecutive output signals, of the plurality of output signals, are correlated and thereby reduced, the final aggregated output corresponding to illuminance for the aggregating period of the pixel, wherein a thermal noise component of the final aggregated output includes only a thermal noise component of a first output signal of the plurality of output signals and a thermal noise component of a last output signal of the plurality of output signals.

18. The method according to claim 17, wherein a signal-to-noise ratio for the final aggregated output corresponds to:

$$SNR_{k\_full} = k \cdot Vlight / \sqrt{2\sigma_{kTC}^2 + k\sigma_{rd}^2},$$

where k corresponds to a number of the plurality of consecutive integration periods, Vlight corresponds to illuminance voltages for the plurality of consecutive integration periods, $\sigma kTC$ corresponds to standard deviation of kTC noise, and $\sigma rd$ corresponds to standard deviation of read noise.

19. The method according to claim 17, wherein the final aggregated output Vfinal corresponds to:

$$Vfinal = k*Vlight + Nktc(k+1) - Nktc(0) + Nrd(1) + Nrd(2) + \ldots + Nrd(k),$$

where k corresponds to a number of the plurality of consecutive integration periods within the aggregating period, k*Vlight corresponds to a sum of illuminance voltages for the plurality of consecutive integration periods, Nktc(k+1) corresponds to the thermal noise component of the last output signal of the plurality of output signals, Nktc(0) corresponds to the thermal noise component of the first output signal of the plurality of output signals, and Nrd( ) corresponds to a readout noise.

20. A non-transitory computer readable recording medium having recorded thereon a program executable by a computer for performing the method of claim 17.

* * * * *